A. T. WEISS.
LABELING MACHINE.
APPLICATION FILED APR. 26, 1909.
1,086,572.
Patented Feb. 10, 1914.
9 SHEETS—SHEET 3.
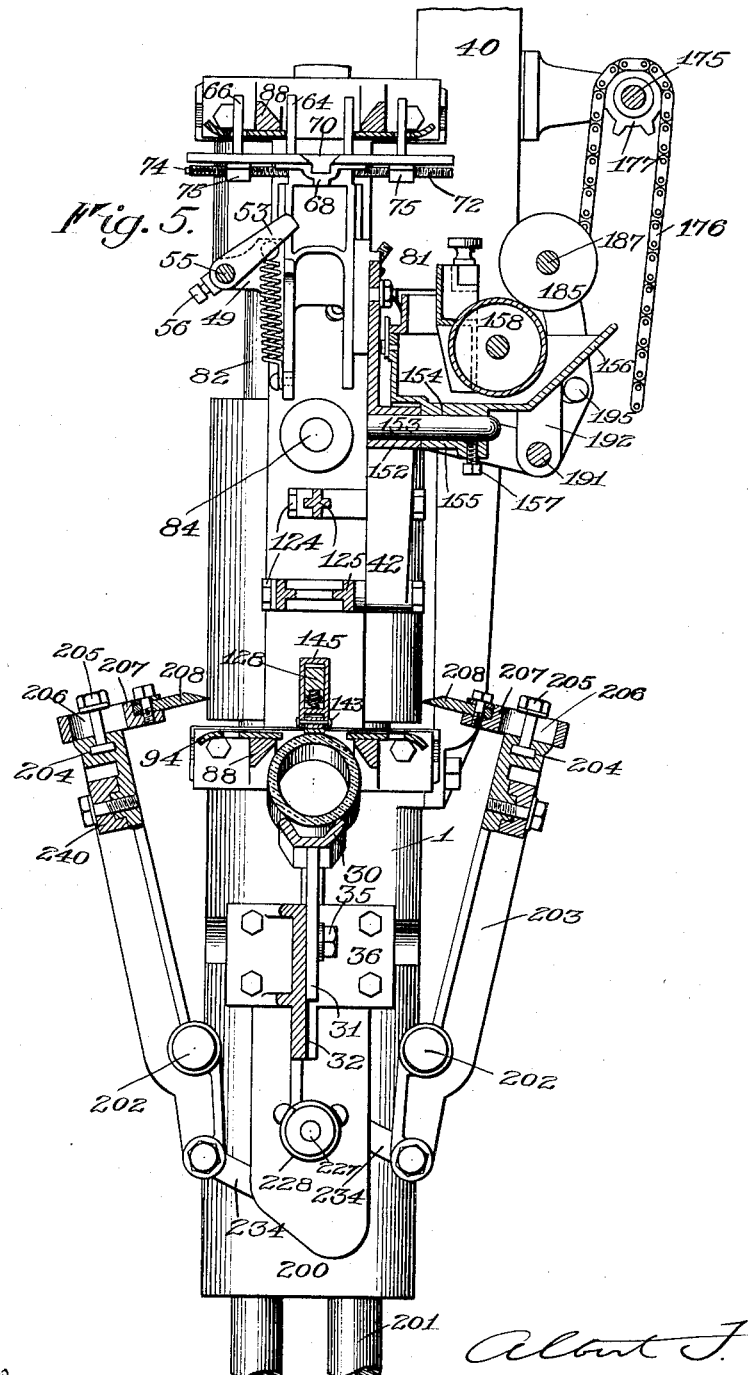

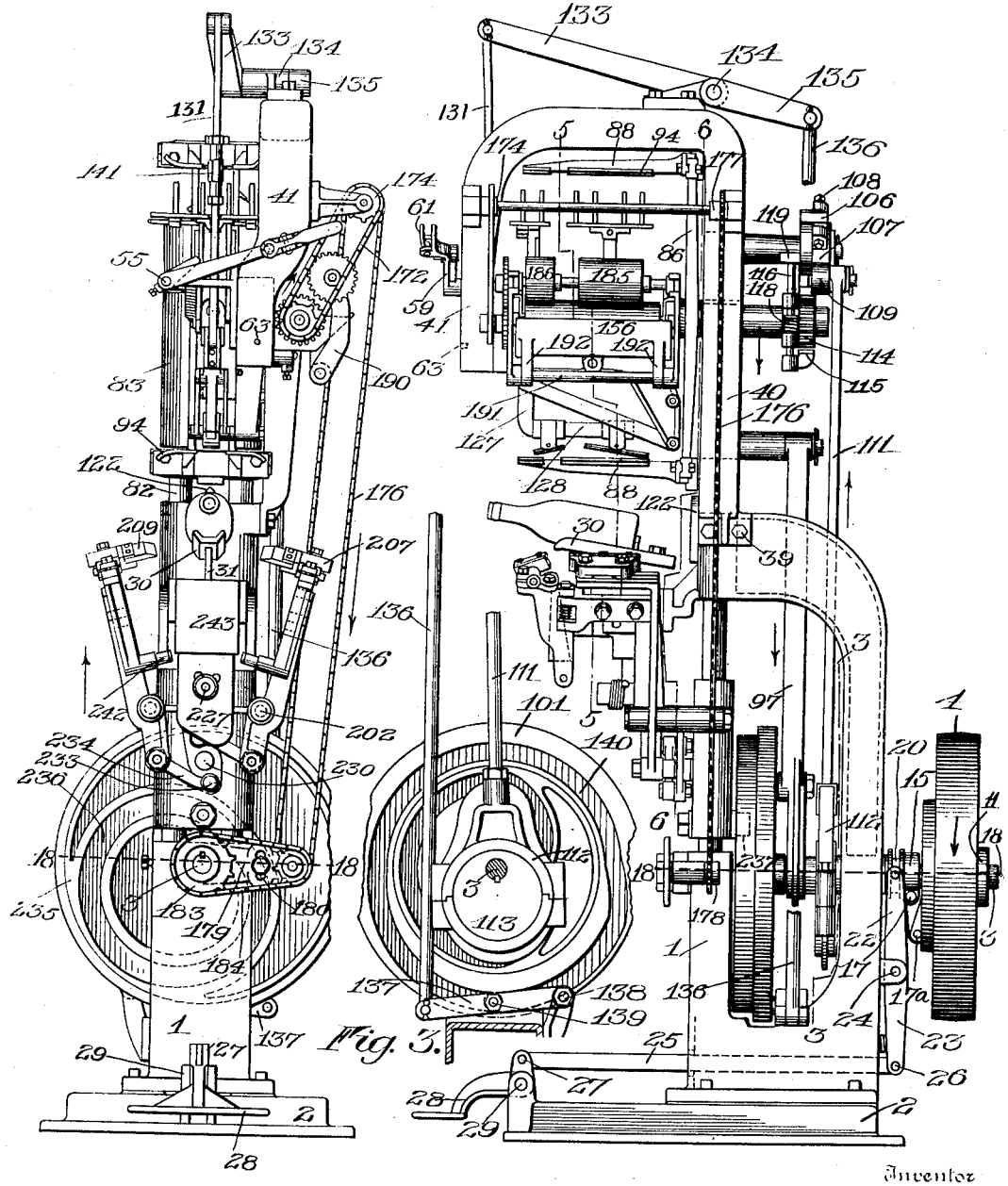

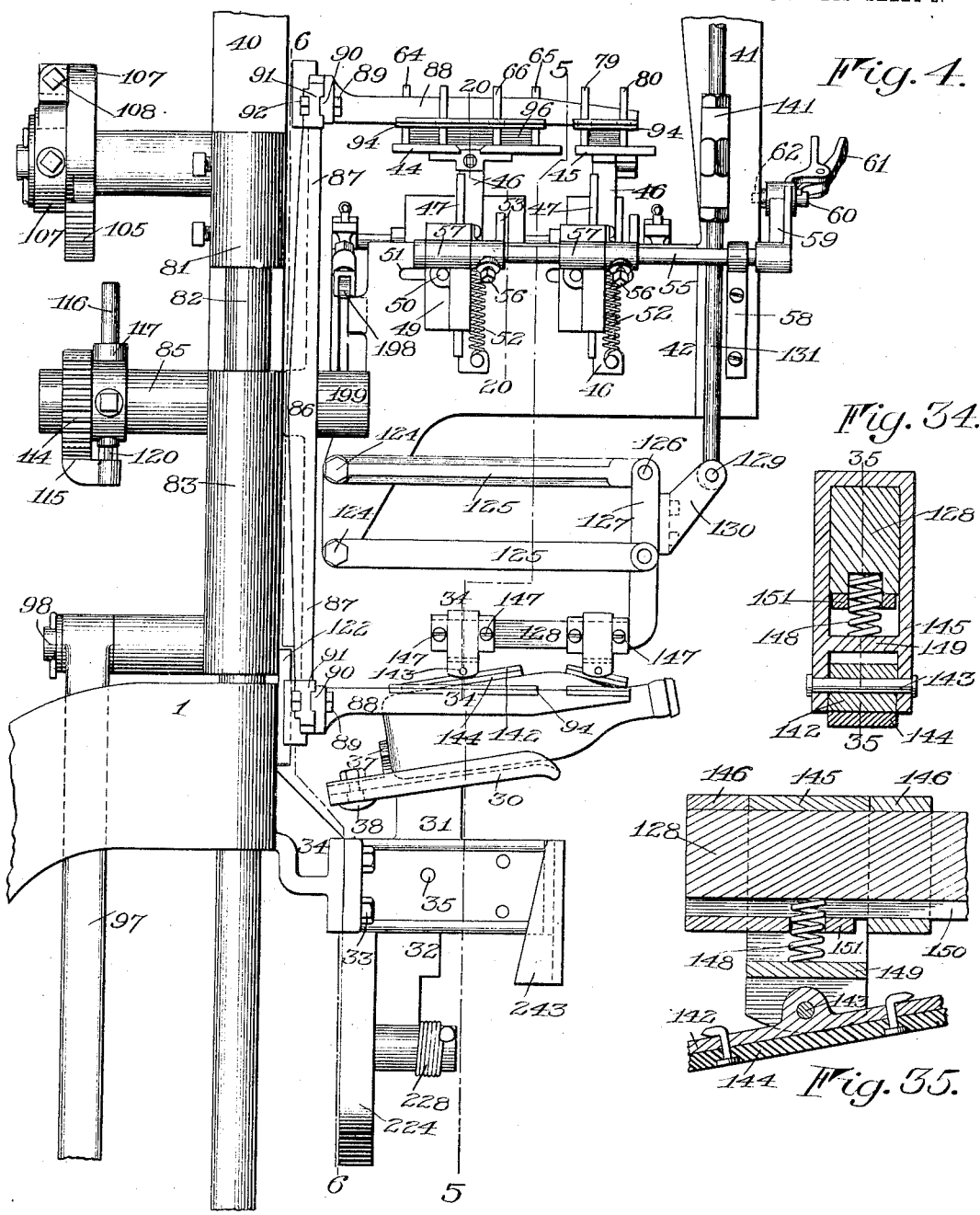

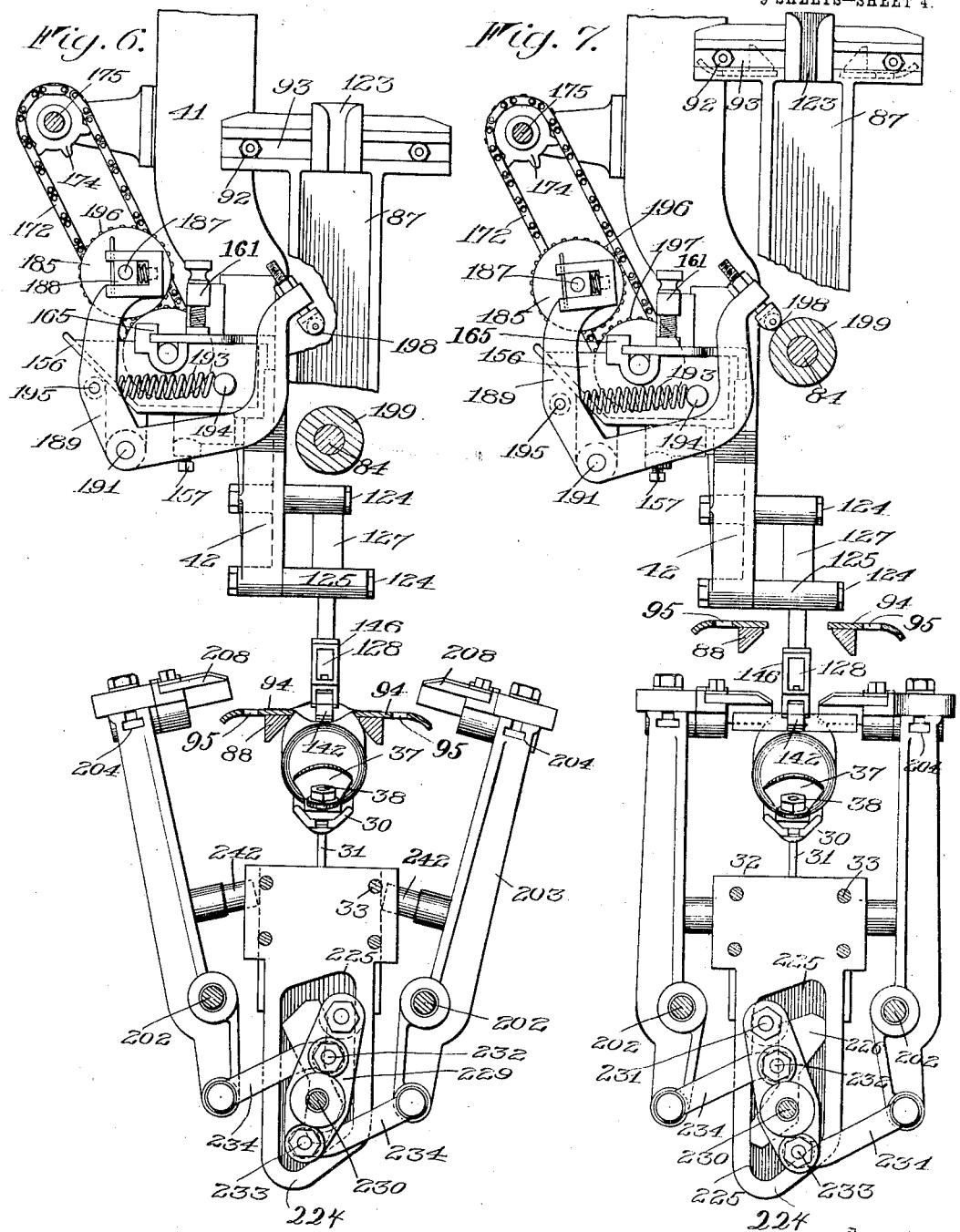

A. T. WEISS.
LABELING MACHINE.
APPLICATION FILED APR. 26, 1909.
1,086,572.
Patented Feb. 10, 1914.
9 SHEETS—SHEET 5.
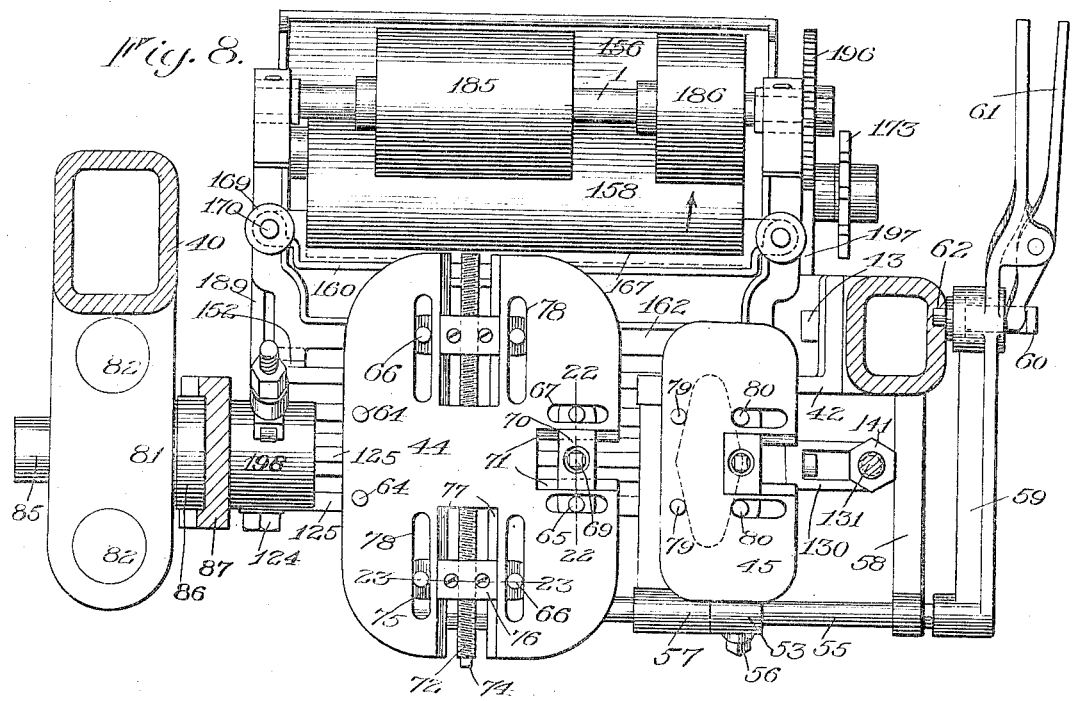
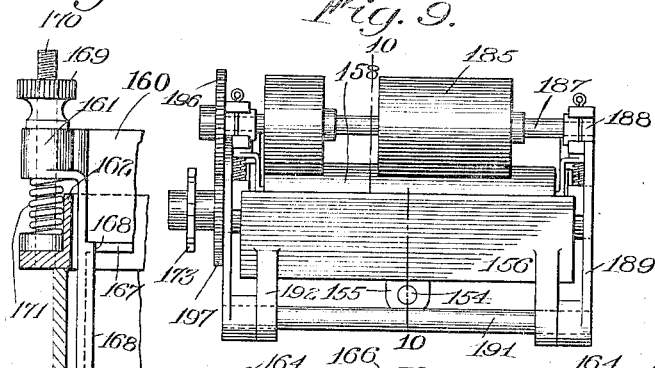
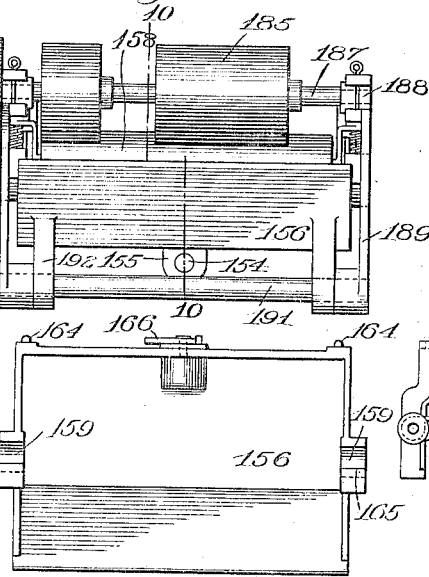
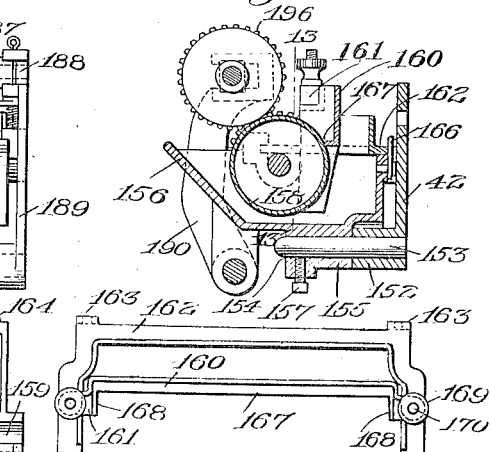
Witnesses
Walter B. Payne
Russell B. Griffiths
Inventor
Albert T. Weiss
By Church & Rich
His Attorneys

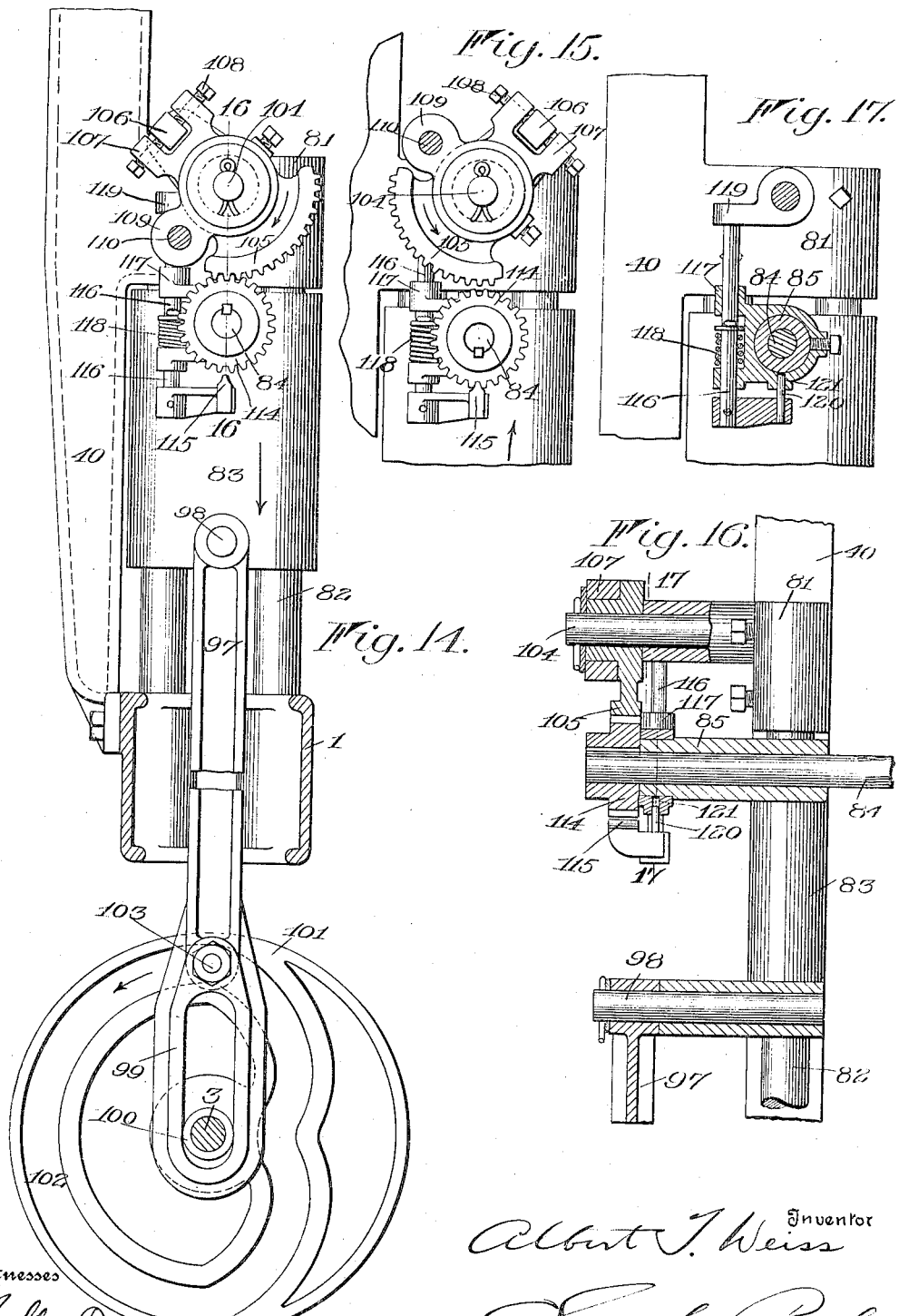

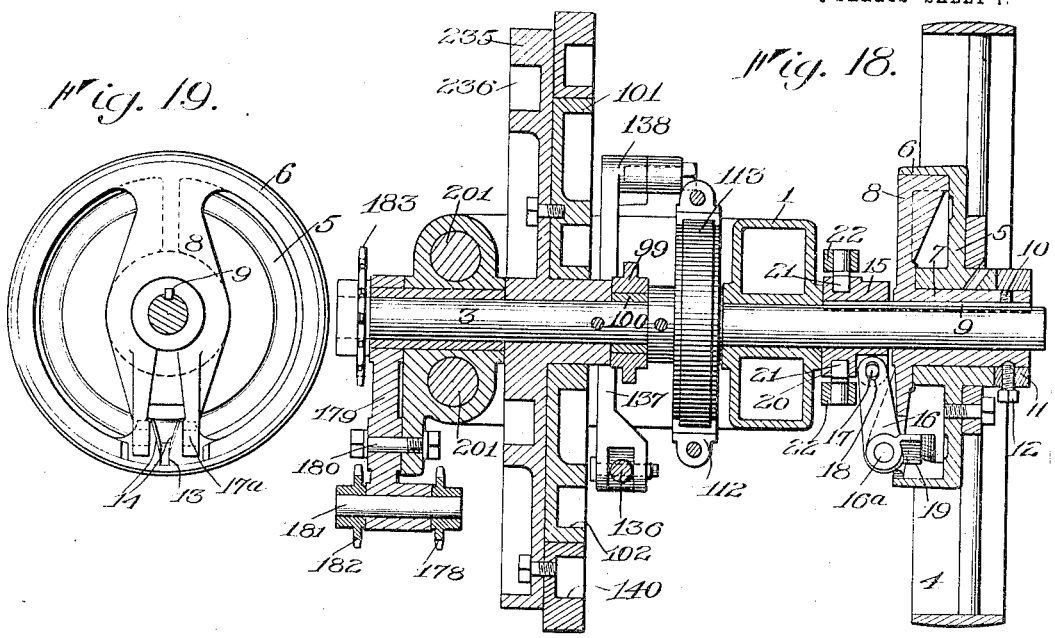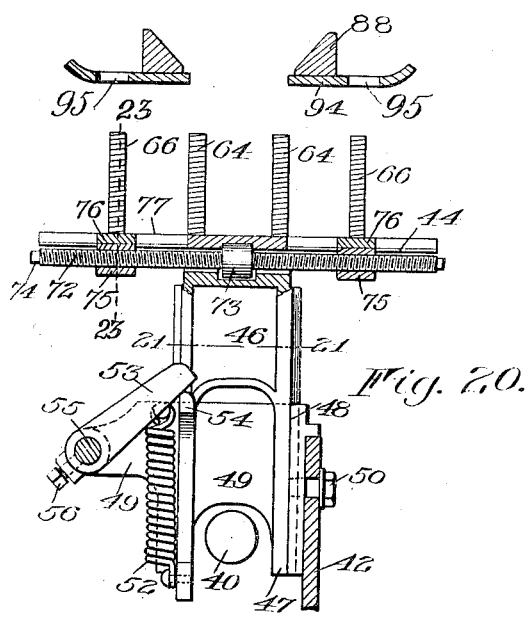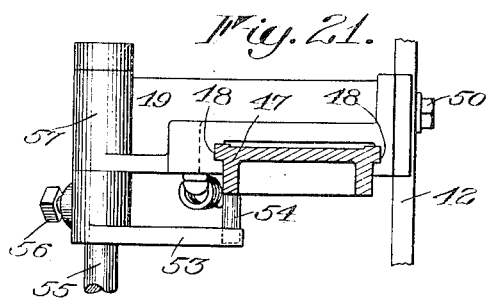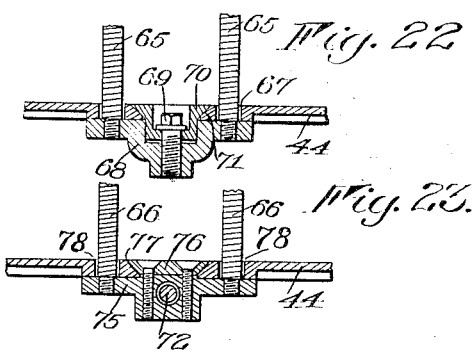

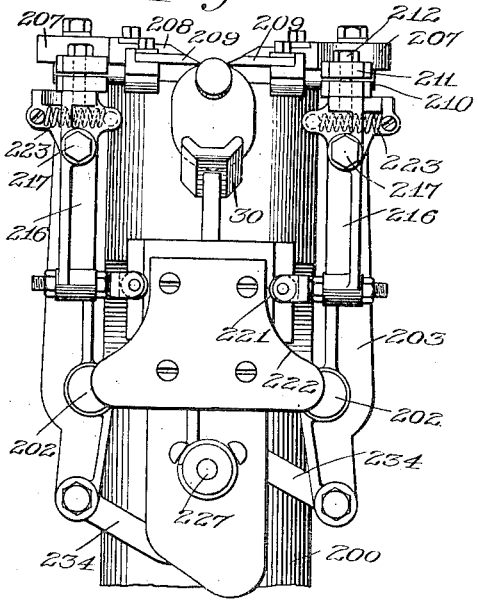

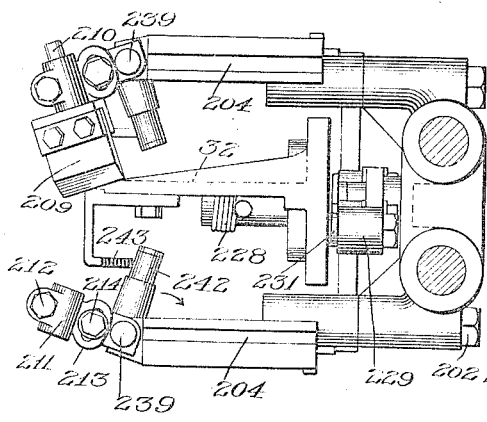
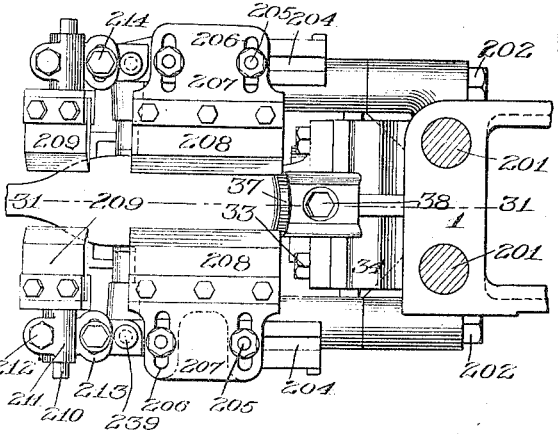
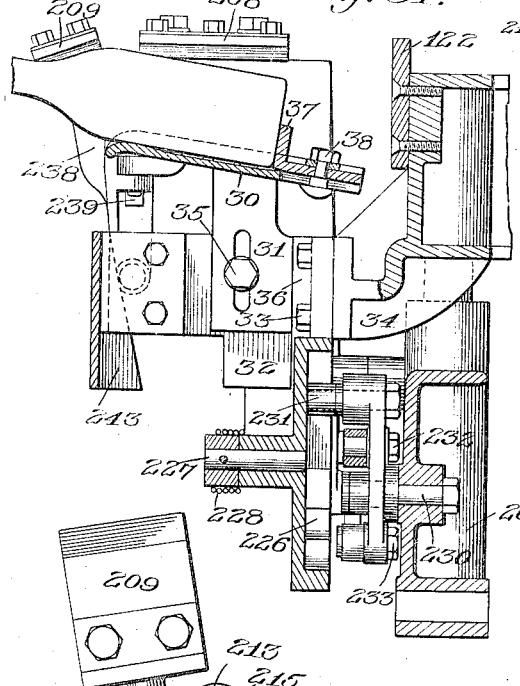
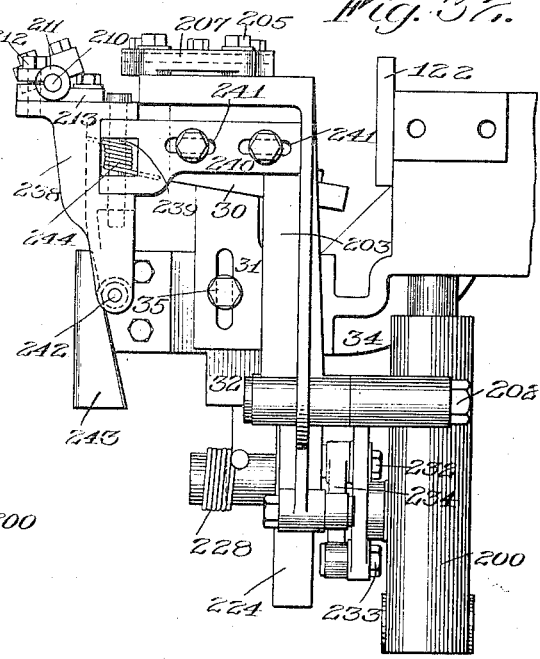
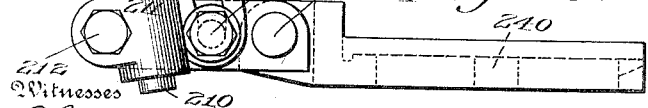

UNITED STATES PATENT OFFICE.

ALBERT T. WEISS, OF ROCHESTER, NEW YORK, ASSIGNOR TO YAWMAN & ERBE MANUFACTURING COMPANY, OF ROCHESTER, NEW YORK, A CORPORATION OF NEW YORK.

LABELING-MACHINE.

1,086,572.  Specification of Letters Patent.  Patented Feb. 10, 1914.

Application filed April 26, 1909. Serial No. 492,132.

*To all whom it may concern:*

Be it known that I, ALBERT T. WEISS, of Rochester, in the county of Monroe and State of New York, have invented certain new and useful Improvements in Labeling-Machines; and I do hereby declare the following to be a full, clear, and exact description of the same, reference being had to the accompanying drawings, forming a part of the specification, and to the reference-numerals marked thereon.

My present invention relates to apparatus for applying labels to articles or containers and has for one of its objects to provide a labeling machine that will be comparatively simple in design and operation and by means of which the articles may be labeled rapidly and the capacity of the machine of this character thus increased.

Another object of the invention is to provide a machine capable of applying either one or two labels of the same or different sizes and shapes to the same article and in any desired position thereon, provision being made for differences in contour of the surfaces of different articles and of different portions of the same article.

My improvements are further directed more particularly toward a general improvement of the various mechanisms for respectively holding the supply of labels, applying the adhesive to each successively, positioning them with reference to the article, applying them thereto and affixing them in the desired manner thereon.

To these and other ends the invention consists in certain improvements and combinations of parts all as will be hereinafter more fully described, the novel features being pointed out in the claims at the end of the specification.

In the drawings: Figure 1 is a front elevation of a labeling machine constructed in accordance with and illustrating one embodiment of my invention. Fig. 2 is a side elevation thereof. Fig. 3 is a rear elevation of the operating devices for the stripper and the picker carriage taken in section through the driving shaft on the line 3—3 of Fig. 2. Fig. 4 is an enlarged detail elevation of the picker mechanism and adjacent parts, viewed from the opposite side of the machine from that represented in Fig. 2. Fig. 5 is a transverse vertical section on the lines 5—5 of Figs. 2 and 4. Fig. 6 is a sectional view taken substantially on the line 6—6 of Figs. 2 and 4, being an enlarged detail in rear elevation of the picker head, glue pot and affixing devices. Fig. 7 is a view similar to Fig. 6, but showing the parts at a different point in the cycle of operation. Fig. 8 is an enlarged top plan view of the label holders or tables and the gluing mechanism. Fig. 9 is a side elevation of the glue pot and its distributing devices. Fig. 10 is a transverse section substantially on the line 10—10 of Fig. 9. Fig. 11 is a top plan view of the glue pot. Fig. 12 is a top plan view of the scraper for the glue feeding roll. Fig. 13 is a detail section of the adjusting devices for the scraper on the line 13—13 of Fig. 10. Fig. 14 is a detail rear elevation enlarged, of the mechanism for imparting the intermittent rotary movement to the picker head. Fig. 15 is a detail showing two of the coöperating parts of Fig. 14 in another position. Fig. 16 is a section substantially on the line 16—16 of Fig. 14. Fig. 17 is a section substantially on the line 17—17 of Fig. 16. Fig. 18 is a sectional view in the plane of the main or driving shaft, through the various driving elements, taken on the line 18—18 of Figs. 1 and 2. Fig. 19 is a front elevation of the main clutch. Fig. 20 is a view of the main label holder, the table and the support for the holder being in section on the line 20—20 of Fig. 4, showing the means by which the holder is moved to an inoperative position. Fig. 21 is a top plan view of the last mentioned devices taken in section through the label holding stem substantially on the line 21—21 of Fig. 20. Fig. 22 is a section on the line 22—22 of Fig. 8. Fig. 23 is a section on the line 23—23 of Figs. 8 and 20. Fig. 24 is a front elevation of the affixing mechanism as set up for one style of work, the affixing fingers being in the positions occupied when they are just beginning the affixing movement. Fig. 25 is a similar view with the fingers and other parts shown in the positions they occupy while affixing the label. Fig. 26 is a side elevation corresponding to Fig. 24. Fig. 27 is a central section on the line 27—27 of Fig. 25. Fig. 28 is a detail of one of the tension devices for the wipers. Fig. 29 is a top plan view of the affixing mechanism when set up for operation upon work of a different character from that of Fig. 23 *et seq.* a wiper of one of the sets being shown in the position it occupies during the affixing operation, and its companion wiper, as well as those of the other set being removed. Fig. 30 is a view similar to Fig. 29 showing the wipers in engagement with the article and in the act of affixing the label thereon. Fig. 31 is a vertical section taken substantially on the line 31—31 of Fig. 30. Fig. 32 is a side elevation corresponding to Fig. 31. Fig. 33 is a detail top plan view of one of the wipers and its attaching portion. Fig. 34 is a transverse section of the stripper and one of the pads or presser feet thereon taken substantially on the line 34—34 of Fig. 4, and Fig. 35 is a section through the same in a plane at right angles to that of Fig. 34, substantially on the line 35—35 of Fig. 34.

In the present exemplary embodiment of the invention I have illustrated a machine adapted more particularly to applying a label or labels to bottles and this particular machine is specifically designed for the requirements of the beer bottling industry wherein it is often desired to apply a body label and usually a relatively smaller neck label. Through the means provided by my present invention I am enabled to definitely place the bottle label in any desired position on the body and the neck label in any desired position on the neck of the bottle simultaneously, the neck label more particularly being smoothly pasted down in all instances, even upon the difficult surfaces often of reverse curvatures when the small label is desired to be placed at the juncture of the neck and body of the bottle, or in other words on the shoulder of the latter.

First referring briefly to its general features the machine illustrated comprises in principle and construction a stationary bottle support; a stationarily mounted though yielding label support; an intermittently rotated and bodily reciprocated picker head having a plurality of pickers thereon that are halted in respective alinement with the label holder and with a bottle arranged on the support; a glue distributing device that coats the pickers during their return movement from the bottle to the label holder which enables the picker to lift a single label and at the same time render it adhesive; a stripper that transfers the label from the picker to the bottle; and wipers that smooth the label down evenly on the latter.

Referring now more particularly to the drawings and to Figs. 1 and 2 thereof, 1 indicates the main frame of the machine supported upon a suitable base 2 and having journaled therein to extend from front to rear a horizontally disposed driving shaft 3 provided with a loose driving pulley 4. The clutch mechanism for locking the pulley to the shaft to operate the machine had perhaps better be first described. The pulley is provided with a fixed clutch element 5 (Figs. 18 and 19) embodying an annular ring 6 that, with the pulley 4, rotates upon a hub 7 on a clutch member 8 splined to the shaft at 9 to rotate therewith and held against sliding movement by set screw 10. A collar 11 secured to the hub 7 by a set screw 12 on the outer side of the pulley prevents endwise movement of the latter together with the clutch member 5 in one direction, while the member 8 prevents movement in the other direction. The member 8 is in the form of an elastic ring or annular member split at 13 and having the adjacent end surfaces 14 inclined to diverge toward the center. A collar 15, rotating with the shaft, but sliding longitudinally thereof on the spline 9, is connected with a bell crank lever 16 having one end pivoted thereto at 17 in a slot 18 of slight proportions and on the outer end of the lever is a cam or wedge 19 that is thrust between the tapered faces 14 and spreads the ring 8 as the collar 15 is moved toward the clutch locking the clutch members 6 and 8 for joint movement and hence the pulley with the shaft. The bell crank 16 is fulcrumed at 16$^a$ on lugs 17$^a$ on the ring 8 (Fig. 19). The clutch operating collar 15 has a peripheral groove or recess 20 therein within which engage shoes 21 on the arms 22 of a yoke lever 23 (Fig. 2) which is fulcrumed on the main frame 1 at 24. A link 25 is pivotally connected with the outer end of the yoke lever at 26 and at 27 with a bell crank treadle 28 arranged forwardly of the machine and fulcrumed on the base 2 at 29. It will be seen from inspection that downward pressure of the operator's foot on treadle 28 will oscillate the lever 23 and cause the heretofore described engagement of the clutch devices 6 and 8 by an advancing movement of the collar 15. The bottle rest or work support and the label holders are preferably arranged one above the other in vertical alinement. In the present embodiment the work support 30 (Figs. 4 and 31) is lowermost and is provided with a slotted stem 31 by means of which it is supported in a manner permitting vertical adjustment on an extension 32 bolted at 33 to a bracket 34 on the main frame 1. A bolt 35 on the said extension coöperates with the slot in the stem and the latter is guided vertically by an abutting shoulder 36 on the extension. The support itself may be of any suitable construction, but preferably includes a rear stop 37 for engagement with the bottom of the bottle, as shown, to position the latter lengthwise with respect to the mechanism, the stop being preferably adjustable as by the slot and bolt connection 38. Bolted to the main frame 1 at 39 (Fig. 2) is an extension frame 40 constituting a continuation thereof and supplied in the form of a forwardly disposed yoke having a forwardly depending arm 41. This arm 41 carries a plate 42 bolted thereon at 43 (Fig. 8) and extending rearwardly across the loop of the yoke to terminate at a point a short distance from the main portion of the frame piece 40. It is upon this plate 42 that I support the label holders and the glue applying devices, the same being arranged upon opposite sides thereof.

Referring first to the label holder the general arrangement of which is best illustrated in Figs. 5 and 8 and the details in Figs. 20 et seq. 44 indicates the main table for the body labels and 45 the smaller table that accommodates the neck labels, both of which are supported upon stems 46 having guiding portions 47 that travel in ways 48 on brackets 49 that are supported for horizontal adjustment toward and from each other to the front or rear by bolts 50 extending through horizontal slots 51 in the plate 42. The holders are yieldingly supported for vertical movement in the guides by springs 52 having their ends connected respectively with the stems 46 and brackets 49, the normal tendency of said springs being to elevate the tables. The limit of this elevating movement, however, is determined by dogs 53 that engage abutments 54 on the stems 46 (Fig. 20) and are themselves held fast on a rock shaft 55, as by the set screws 56, the shaft being journaled in bearing lugs 57 on the brackets 49 and in an additional forward bracket 58. The shaft 55 is operated by a lever 59 that carries a spring actuated latch plug 60 retracted by means of a finger lever 61, and which plug is adapted to engage with upper and lower recesses 62 and 63 in the outer face of the arm 41 of the yoke. When in engagement with the upper recess 62, as shown in the figures, the tables 44 and 45 are at their upward limit of movement and in their operative positions, but when it is desired to temporarily throw the tables to an inoperative position, in order that the labels carried thereby may be held out of reach of the pickers, (to be hereinafter described), so that the feed of labels is stopped, the lever 59 is depressed rocking the shaft 55 and causing the dogs 53 to depress the tables against the tensions of the springs 52. The set screws 56 allow a rotary adjustment of the dogs 53 whereby the maximum elevation and normal positions of the label holding tables may be changed and also an adjustment longitudinally of the shaft in order that they may be accommodated to different relative adjustments of the tables on the supporting plate.

The body labels are positioned upon the main table 44 by fixed pins 64 at the rear and adjustable pins 65 at the front, and adjustable pins 66 at the sides, (Fig. 8). The pins 65 project upwardly through slots 67 in the table from a carrier plate 68 that is adjustably clamped by a bolt 69 threaded therein and having its head bearing against the head 70 slidable in ways 71 on the table whereby the pins 65 are adjusted relatively to the pins 64 for the height of the body label to be held between them. The pins 66 engage the lateral edges of the labels and are adjusted simultaneously toward or from each other for the width of the label by a right and left screw 72 journaled at 73 and having operating portions 74 adapted to receive a wrench or key. It will be noted that by this simultaneous and equal movement of the pin 66 the labels are always held centrally on the table regardless of their width. It is not necessary to provide this adjustment for the front and rear pins 64 and 65 as the table is adjustable as a whole in these directions by means of the supporting connections of the brackets 49, as before pointed out. The screw 72 at either end is threaded into plates 75 that support the pins 66 (Fig. 23) which plates are held against the bottom of the table by head plates 76 operating on inclined guiding surfaces 77 and the pins also project through slots 78 in the table corresponding to the slots 67. The table 45 for the neck labels is fitted with pins 79 and 80 corresponding in arrangements with the pins 64 and 65 of the body label table and they need not, therefore, be further described. As the neck labels are usually of the general form shown in dotted lines in Fig. 8, it is not ordinarily necessary to provide the lateral engaging pins corresponding to the pins 66, of the main table though these may be added, if desired or found necessary. Extending between the head of the main frame 1 and a lug 81 on the extension frame 40 is a pair of vertical guide rods 82 (Figs. 4 and 14) upon which reciprocates the picker carriage 83 carrying a horizontal stud shaft 84 in bearings 85 and fixed on the forward projecting end of the shaft is a picker head 86 embodying oppositely extending radial arms 87 that rotate in a plane extending transversely of the machine between the rear end of the label supporting plate 42 and the main frame of the machine. The pickers 88 embody forwardly extending bars arranged in pairs on the end of each arm 87 and in the present instance the bars are secured to the arms by bolts 89 which hold projecting and recessed portions 90 and 91 on the bars and arms respectively in engagement for centering purposes. The heads 92 of the bolts are preferably arranged in channels 93 on the rear side of the arms to hold them against rotation. To the under sides of the arms 88 which extend across the tables of both label holders are secured picker plates 94 having openings 95 therein through which the upwardly projecting pins 66 are adapted to pass as the picker descends upon the pile of labels retained between the pins, the said plates being thus disposed laterally of the extreme edges of the labels to insure an application of the adhesive at these points whereat the label is most likely to start to peel from the bottle or other article to which it is applied.

In operation, the picker head is rotated intermittently, preferably in the same direction, and each stop that it makes brings one of the pickers 88 over the label holders while the other, in a relatively reversed position is swung over a bottle or other article arranged in the support 30, as shown in Fig. 2, the picker carriage 83 having at this time arrived at its uppermost position on the guides 82. The returning reciprocation of the carriage 83 causes the uppermost arm 88 to move downwardly until the picker plates 94, which have previously been supplied by a coating of the adhesive substance through the operation of devices which will be hereinafter described, firmly engages the topmost label of a supply pile 96 that has been previously arranged upon the tables 44 and 45 with the labels face down, (Fig. 4). The label holders are, of course, depressed upon their yielding supports during this operation, the pressure of which causes the topmost label to properly adhere to the picker plate. The picker carriage 83 is by this time moving upwardly again and when a point is reached at which the uppermost picker 88 and its adhering label clears the tops of the projecting pins on the label support, the rotary movement of the head 86 is continued and the adhering label is brought to a position, paste side down, above the bottle or work piece, the picker arms extending longitudinally upon either side of the latter. The lowermost picker has by this time reached an upper position over the label support in readiness to remove the succeeding label, and, as it travels downward to accomplish this through the next reciprocation of the carriage 83, the label that is over the bottle is at the same time moved downwardly against the latter and stripped from the picker through the operation of devices which will be later described. The cycle of operation is then repeated. The reciprocation of the picker carriage 83 is brought about by the mechanisms best illustrated in Figs. 2, 14 and 18 and comprises, in the present instance, a connecting rod 97 pivoted thereto at 98 at its upper end, the lower end being in the form of a yoke 99 that coöperates with a roller 100 on the main driving shaft 3 to form a guide. Fixed on the shaft 3 adjacent the roller 100 is a cam disk 101 having a cam track 102 on its rear face. A projecting pin 103 on the connecting rod 97 operates in the cam track 102 and raises and lowers the carriage according to the succession of surfaces presented, as will be understood from an inspection of the cam track in Fig. 14.

The mechanism that I prefer to employ for bringing about the intermittent rotary movement of the picker 86 which, as before described, is carried on the shaft 84, journaled in the picker carriage 83, is illustrated in Figs. 14 to 17. Loosely journaled on a stud shaft 104 on the lug 81 of the frame piece 40 is a segmental gear 105 having a dog 106 thereon that extends between the arms of a yoke 107 also loosely journaled on the shaft, the segment and yoke being adapted for slight relative rotary adjustment by the provision of set screws 108 threaded into the yoke arms 107 and against which the dog 106 contacts. To a projecting lug 109 on the yoke 107 is pivoted at 110 an eccentric rod 111 (Fig. 2) which, at its lower end, carries an eccentric strap 112 coöperating with an eccentric 113 on the driving shaft 3 (Figs. 3 and 18). The eccentric rod 111 operates to rock the segment 105 through the arc indicated by the positions of the segments in Figs. 14 and 15. A gear wheel 114 fixed on the picker shaft 84 moves with the reciprocations of the carriage 83 into and out of mesh with the segment 105 and the parts are so timed that it moves into mesh as the segment assumes the position shown in Fig. 15 at which point the pickers have just completed their respective picking and applying operations and are being raised by the carriage to their highest positions. The latter having been reached, the segment moves to the right to the position indicated in Fig. 14 rotating the picker shaft 84 through the medium of the gear 114 and when the half revolution is completed that brings the pickers in the reverse alinement, the gear 114 moves away from the segment as the carriage 83 is then returning on its downward path.

To prevent rotary motion of the picker head during the reciprocations of the carriage, the latter is fitted with a stop 115 carried on a plunger 116 that reciprocates vertically in supporting lugs 117 and is normally forced by springs 118 to a position in which the stop 115 engages between successive teeth of the gear 114 and locks the latter against movement. However, as the carriage 83 rises to bring the gear 114 again in mesh with the segment 105 the stop 115 is automatically withdrawn from the gear by an engagement of the upper end of the plunger 116 with the projecting lug 119 on the stationary frame. A centering pin 120 on the stop 115 operates in an aperture 121 adjacent the bearing of the picker shaft to keep the stop in proper alinement at all times. To further prevent any lateral deviation of the pickers 88 during their vertical movements, a projecting centering member 122 is provided on the main frame 1 (Fig. 4) that engages between abutments formed by the opposite walls of a channel 123 on the ends of the picker arms 87 immediately upon the downward movement of the picker head. This is a safeguard against any possible play in the mechanism in which the stop 115 is an element and insures proper alinement of the label above the bottle and of the openings 95 in the picker plates 84 of the uppermost picker with the label retaining pins of the label holder.

The means for stripping or transferring the label from the lowermost pickers in applying it to the bottle will now be described: Pivoted at 124—124 to a rearward depending portion of the plate 42, as best shown in Fig. 4, are two parallel links 125 having their opposite or forward ends pivoted at 126—126 to the vertically extending portions 127 of an angular bar, the horizontally extending portion 128 of the bar being thereby given a parallel motion toward and from the work support 30 and a bottle or other article arranged therein. Pivoted at 129 to a bracket 130 carried by the bar 127 is a rod 131, the upper end of which (Fig. 2) is pivoted to one arm of a lever 133 fulcrumed at 134 on the top of the frame piece 40. The opposite rearwardly extending arm 135 is pivoted to a rod 136 pivotally connected with a lever 137 fulcrumed on the frame 1 at 138. At an intermediate point the lever 137 is preferably provided with a projecting pin or member 139 that travels in an outer cam track 140 on the cam disk 101 that also operates the picker carriage. This cam track 140 is so formed as to impart to the links 125 and hence the bar 128, through the intermediary members mentioned, an intermittent reciprocatory or up and down movement, the limits of which are subject to change through a turnbuckle adjustment 141 on the rod 131. The stripper bar 128 carries stripper feet or pads 142 pivoted centrally at 143 and preferably provided with a yielding nonabrasive facing of rubber or other suitable material 144, there being a stripper for each label, both neck and body (Figs. 4, 34 and 35). The stripper pads are pivoted upon yoke members 145 having a vertical movement on the bar 128 between collars 146 adjustable longitudinally on the latter as by set screws 147 whereby the pads are positioned above the various portions of the bottle or article upon which it is desired to apply the labels. A spring 148, acting between a web 149 on each yoke 145 and the bottom of a longitudinal channel 150 on the under surface of the bar 128 is held in place by being passed through an opening in a lower projecting portion 151 in one of the collars 146 and renders the stripper yielding in its nature.

As shown in Fig. 2 the stripper bar 128 is in its uppermost position and above the label to be applied at the same time that the latter is swung into its initial position above the bottle and the stripper pads are adapted to pass between the bars 88 that are supporting the label. From thence the stripper moves downwardly with the picker in approximately the same relative position, until the pads press the labels at their centers firmly against the surface of the bottle and remain there while the pickers are traveling upwardly again to a point at which they are free of the labels. They further remain until the pickers that have just deposited the label start laterally with the rotation of the picker head 86, the said pickers being enabled to pass between the bar 128 and the lowermost link 125, and at one side of the stripper and article, but before the upper pickers carrying the next label to be applied can reach a position over the work support the stripper bar 128 is quickly raised and the new label takes its position above the bottle but below the stripper pads 142, as before.

The provision for applying the adhesive to the picker plates 94 as they rotate from the bottle rest to their position above the label holder will now be taken up and is illustrated in Figs. 1 and 2 and by the figures on the sheet containing Fig. 8. A flange 152, extending from the opposite face of the plate 42 from that upon which is arranged the label holding parts, has projecting centrally therefrom a pin 153 that extends through a bore 154 in a lug 155 on the bottom of a paste or glue receptacle 156 that is detachably secured thereon as by the set screw 157, the rear edge of the receptacle preferably resting on the flange 152, as clearly shown in Figs. 5 and 10. A preferably hollow metallic feed roller 158 is journaled in bearings 159 in the end walls of this glue pot and is intended to run with the lower portion thereof, at least, submerged in a liquid adhesive, that commonly used for such purposes being usually a mixture of glue and some starchy paste. Attention is directed to Figs. 9 to 13 of the drawings. A scraper plate 160 for removing excess of glue from the feed roller as it rotates in a direction indicated by the arrow in Fig. 8 is carried by means of lugs 161 on a frame piece 162 having perforated depending lugs 163 that engage over pins 164 on the receptacle at one edge of the frame while the opposite edge engages beneath the lugs 165 (shown in Figs. 6 and 11) and covers the bearing of the feed roller at both ends, the frame being held in this position preferably by a suitable latch 166 on the receptacle. The scraper 160 is provided with a knife 167 that engages the periphery of the roller and with knives 168 that engage the end faces thereof. The peripheral knife is adjusted toward the roller by thumb screws 169 operating on posts 170 and against the lugs 161 on the scraper through which the posts also pass against the tension of springs 171 interposed between the lugs 161 and the frame 162 by means of which springs a nice adjustment can be obtained.

Referring now additionally to Figs. 1, 5 and 8, the feed roller is preferably continuously driven by means of suitable driving connections, those employed in the present instance comprising a chain 172 running over a sprocket 173 on the shaft of the roller 158 and over a sprocket 174 on a counter shaft 175 journaled on the frame piece 40. Shaft 175 is driven by a chain 176 running over a sprocket 177 thereon and over a sprocket 178 of a stud shaft 181 carried by an arm 179 mounted on the journal of the main driving shaft 3 and having a slotted adjustment 180 with the main frame 1 by means of which the chain 176 is taken up when desired. The stud shaft 181 also carries a sprocket 182 connected with driving sprocket 183 on the main driving shaft by a chain 184. The distributing rolls 185 and 186 for the large and small labels, respectively, are preferably arranged upon a common shaft 187 and are actuated to move from a position in contact with the feed roll 158 in which they receive a charge of the adhesive, as shown in Fig. 6, to the position shown in Fig. 7 out of contact with the feed roll, whereat they are disposed for the moment tangentially to the circular or swinging path of the pickers 88. They, therefore, roll across the picker plates 94 as the latter make the movement from the work support upwardly to remove a new label, as previously described, and coat them with an amount of glue sufficient to pick the labels from the piles and to be transferred thereto for gluing the labels to the bottles. I effect this oscillating movement of the feed rollers in the present instance by mounting the shaft 187 in yielding bearing blocks 188, one of which is mounted on the arm of a bell crank lever 189 at the rear of the adhesive receptacle, while the other is mounted on a lever 190 at the forward end. Both levers are carried in fixed positions on a rock shaft 191 journaled in depending lugs 192 on the receptacle 156. A spring 193 secured to the receptacle at 194 and to the bell crank at 195 has a normal tendency to move the distributing roller into contact with the feed roller in which position gears 196 and 197 on the distributing and feed roll shafts respectively, are brought into mesh, as shown in Fig. 6, causing the feed roll to positively traverse the entire circle of the peripheries of the distributing rolls. A preferably adjustable friction roller 198, carried on the other end of the bell crank 189, is disposed in the path of a projecting hub 199 on the picker head 86 and when the latter is elevated to the point at which its rotation begins this hub 199, engaging the friction roller 198, oscillates the bell crank, as shown in Fig. 7, and throws the feed rolls 185 and 186 out into the path of the pickers where, the gears 196 and 197 being then out of mesh, the feed rolls are free to roll across the surfaces of the picker plates 94.

The devices for affixing the labels to the bottles and smoothing them down into even conformity with the surfaces thereof after the coated labels have been brought into position by the pickers and are held clamped against the bottle by the stripper pads 142, are illustrated in the form first to be described in Fig. 24, and the accompanying figures on the same sheet, although certain figures representing the other form may be referred to for certain parts common to both. A carriage 200 is arranged to reciprocate vertically on guide rods 201 that may be conveniently furnished by extending downwardly the guide bars 82 of the picker carriage, and pivoted at 202 on the carriage upon opposite sides of the work support 30 are vibrating wiper arms 203. On the upper ends of the arms are formed horizontal channels or ways 204, as shown in Fig. 30, to adjustably retain the heads of bolts 205 passing through slots 206 in plates 207 which are thereby secured to the arms and which carry flexible non-abrasive body wipers 208, preferably of rubber. The slots 206 extend at right angles to the channels 204 and it will be seen from inspection that the plates 207, and hence the wipers, are thereby rendered adjustable both toward and from the work support and longitudinally thereof. Similarly formed neck wipers 209 are carried by stems 210 adjustable toward and from the work support in split sleeves 211 wherein they are clamped by bolts 212, the sleeves 211 being formed on heads 213 that are themselves secured by and adjustable about the bolt 212 as a pivot to vary the angles of the wipers relatively to the longitudinal extent of the work support and of a bottle arranged therein by means of bolts 214 arranged in slots 215 (Fig. 33). The wipers 209 are also adjustable to different angles from the horizontal, as in Fig. 32, for instance, by the rotation of the stems in their sleeves.

The heads 213 are carried on wiper arms 216 pivoted at 217 to vibrate on a horizontal axis toward and from the body rest to an arm 218 secured to the arm 203 by bolts 219 passing through slots 220, which arrangement permits a separating or the opposite relative adjustment of the body and neck wipers. The lower ends of the wiper arms 216 are provided with preferably adjustable friction rollers 221 that coöperate with the similarly formed opposite edge surfaces of a cam plate 222 secured preferably upon the extension 32 of the fixed bracket 34 on the main frame, before described in connection with the bottle rest, the rollers 221 being held against the cam at all times by springs 223 connected to the arms 216 and the bracket arms 218, respectively, as shown in Fig. 28. A depending plate 224 secured between the brackets 34 and the extension 32 thereof has formed in its rear face a cam track 225 (Figs. 6 and 7) having a switch 226 therein carried on a stud 227 held under the tension of the spring 228 in the normal position shown in Fig. 5. A link 229 mounted on a stud 230 carried by the carriage 200 is provided with a projection 231 engaging within the cam track 225 and pivoted to this link 229 at 232 and 233 upon opposite sides of its own pivot are links 234 which connect the link 229 with the main wiper arms 203. The wiper carriage 200 is reciprocated up and down by a cam disk 235 (Figs. 1 and 18) secured on the front face of the cam disk 101 that controls the movements of the picker carriage, the disk 235 being provided with a cam track 236 within which engages a projection 237, shown partly in dotted lines in Fig. 2, on the rear of the wiper carriage. When the picker carrying the glue coated label together with the strippers moves from the position of Fig. 1 downwardly against the bottle, as heretofore described, the wipers are spread, as shown in Fig. 6, the wiper carriage being in or just approaching its uppermost position. As the wiper carriage moves upwardly, the projection 231 on the link 229 moves upward on the right hand side of the cam track 225, as shown in Fig. 6, until it clears the top of the switch plate 226 which latter, under the influence of the spring 228, flies over to the position shown in Fig. 7. The wiper carriage then begins to descend just as the pickers move upward out of the way (having deposited the labels) and the projection 231 striking the inclined edge of the switch is deflected to the left which rocks the lever 229 and through the connecting links 234 moves the wiper arms inwardly over the edges of the labels that are being held in place by the stripper pads 142. A continued downward movement of the wiper carriage with the wiper arms 203 maintained in this position causes the yielding wipers 208 to spread the label down firmly upon both sides. The projection 231 rounds the lower end of the switch in a corresponding manner and returns on its up trip for another operation. The neck wipers 209 are in the meantime similarly affixing the neck labels, but while the body labels seldom, if ever, extend when in place more than half way around the bottle, the neck labels extend about at least two-thirds and usually the entire circumference of the bottle neck, the neck wipers must travel downwardly and then again inwardly to paste the edges of the label on the underside of the neck. The cam 222 is so shaped as to bring about this result and it is because of this differential movement that the neck wipers in the present instance are given this additional independent movement relatively to the body wipers. It will be seen, however, from the subject matter disclosed, that by varying the contours of the cam arrangement almost any desired movement may be given to either or both sets of wipers under different working conditions. When the wipers have completed the affixing operation the stripper bar 128 moves upwardly, as before described, and the wipers as well, and it is then that the labeled bottle is removed and the succeeding one inserted.

The neck label affixers or wipers, just described, are the ones employed when the neck label is pasted well up on the neck of the bottle, but when it is desired, as often happens, to paste a label upon the shoulder of the bottle at the juncture of the neck and body, it is preferable that these wipers be given a movement longitudinally of the bottle toward the body thereof as well as inwardly against its sides. To accomplish this result I provide a slightly modified structure from that just described, illustrated in Figs. 29, 30, 31 and 32, and the assembled views of Figs. 1 and 2 are also of a machine set up for this work. Referring to the figures mentioned, the wiper heads 213 are not provided with the swinging adjustment afforded by the slot 215 and bolt 214 of the other structure but are mounted upon arms 238, pivoted at 239 to swing on a vertical axis on a bracket arm 240 having slots 241 corresponding with those on the bracket arms 218 and with which it is interchangeable upon arms 203. At their lower ends the arms 238 carry rollers 242 that bear upon the rearwardly turned edges of a cam plate 243 against which they are held by springs 244. The cam plate 222 can be removed while the other is in operation, as shown in Fig. 32, but ordinarily there is no objection to leaving them both on together, as in Fig. 27. With this other construction it will be seen that the rollers 242 following the surfaces of the cam 243, which are inclined longitudinally of the bottle, will swing the wiper heads 213 and the wipers 209 rearwardly, as shown in Fig. 29, at the same time that they are moving inwardly, and the label is properly smoothed out upon the difficult reverse curve at the shoulder of the bottle.

The relative timing of the respective driving parts is such that the wiper carriage 200 is moving upwardly while the picker carriage 83 is moving down and up and by the time the picker head 86 begins to rotate in its upward position, the wiper carriage is beginning to travel downward again. This, while necessary in the present instance to the proper operation of the driven parts, has another advantage in that the weight of the wiper carriage will be of itself sufficient to cause the picker head to complete its half rotation bringing the pickers in their operative positions of vertical alinement even though the power is released from the driving shaft just as such rotary movement is started. The operator stands at the front of the machine with his foot on or near a treadle 28 and manipulates the bottles, preferably by hand, removing the bottles with one hand and replacing them with the other.

I claim as my invention.

1. In a labeling machine, the combination with a revolving picker and means for also imparting a radial movement thereto, of an adhesive distributer arranged in the circular path of the picker to coat the bare face thereof prior to its radial movement, a label holder arranged in the path of radial movement of the picker and from which the outermost label may be picked and pasted by virtue of its attachment to the picker face, and means for transferring the pasted label to the article to be labeled, pasted side foremost.

2. In a labeling machine, the combination with a picker, means for revolving it repeatedly in the same direction and means for also imparting a radial movement thereto, of an adhesive distributer arranged in the circular path of the picker to coat the bare face thereof prior to its radial movement, a label holder arranged in the path of radial movement of the picker and from which the outermost label may be picked and pasted by virtue of its attachment to the picker face, and means for transferring the pasted label to the article to be labeled, pasted side foremost.

3. In a labeling machine, the combination with a label holder, of an intermittently revolving picker head, a picker thereon arranged to pass the label holder repeatedly in the same direction and means for reciprocating the picker head bodily to give the picker a radial movement toward and from the holder in the intervals between the revolving movements.

4. In a labeling machine, the combination with a work support, of a swinging label carrier, the carrier and support having relative reciprocatory movement toward and from each other in a direction radially of the carrier, and a stripper for transferring a label from the carrier to an article on the support.

5. In a labeling machine, the combination with a work support, of a revolving label carrier, a relatively fixed picker thereon having a radial reciprocatory movement together with the carrier toward and from the support, a stripper for transferring the label from the picker to an article on the support, and wipers for smoothing down the label on the article.

6. In a labeling machine, the combination with a work support, of a revolving label carrier arranged to pass the latter repeatedly in the same direction and a relatively fixed picker thereon having radial movement together with the carrier toward and from the support.

7. In a labeling machine, the combination with a work support, of an intermittently revolving label carrier arranged to pass the latter repeatedly in the same direction and having a radial movement toward and from the support in the intervals between the revolving movements and a relatively fixed picker thereon adapted to engage the labels.

8. In a labeling machine, the combination with a label holder and a work support, of a pair of relatively stationary pickers arranged to swing from one to the other and to simultaneously reciprocate one toward and from the holder and the other toward and from the work support.

9. In a labeling machine, the combination with a rotating picker head having diametrically opposite pickers thereon, of a label holder and a work support arranged on opposite sides of the axis of the head, and means for reciprocating the picker head bodily to simultaneously move them one toward and from the label holder and the other toward and from the work support.

10. In a labeling machine, the combination with a rotating picker head having diametrically opposed pickers thereon, of a label holder and a work support arranged upon opposite sides of the axis of the head, one within and the other without the circle described by the pickers, means for intermittently rotating the picker head to halt the pickers in respective alinement with the label holder and work support and means for reciprocating the picker head in line with said last mentioned parts between its rotary movements.

11. In a labeling machine, the combination with a frame having guides thereon, a picker carriage reciprocating on the guides and a rotary picker head journaled on the carriage having diametrically opposed pickers thereon, of a label holder and a work support arranged upon opposite sides of the axis of the head, one within and the other without the circle described by the pickers, means for intermittently rotating the picker head to halt the pickers in respective alinement with the label holder and work support, and means for reciprocating the picker carriage between the rotary movements of the head to move the pickers, one toward and from the label holder and the other toward and from the work support.

12. In a labeling machine, the combination with a label holder and a work support, of a picker arm mounted to swing from one member to the other in a plane at one side thereof and a picker carried by the arm comprising two relatively spaced bars attached to the arm and arranged to project laterally therefrom substantially at right angles to the plane of movement of the picker arm over one of the members.

13. In a labeling machine, the combination with a work support, of a label carrier arm mounted to swing in a plane at one side thereof and transversely of a bottle arranged in the support and a label carrier on the arm comprising two relatively spaced bars attached to the arm at one end and arranged to project laterally therefrom substantially at right angles to the plane of movement of the picker arm over the label support and longitudinally of a bottle arranged in the latter.

14. In a labeling machine, the combination with a support, guides thereon, a reciprocating picker carriage movable on the guides, a label holder and a work support, of a picker head journaled in the carriage on an axis extending transversely of the guide and embodying a radial arm having a picker thereon adapted to swing into register with the label holder and work support, successively, means for reciprocating the carriage to move the picker radially toward and from the member with which it is brought in register and coöperating devices on the arm and support, respectively, for centering the picker against said member and preventing rotation thereof during its reciprocation comprising a channel formed in one of the parts and a fixed projecting rib on the other.

15. In a labeling machine, the combination with a label holder and a work support, of a label carrier arranged to swing from one of said members to the other and in register therewith, means for reciprocating the carrier radially toward and from the member with which it is in register and devices for centering the carrier for such reciprocating movement against swinging movement in both directions embodying a relatively stationary guiding part and a part on the carrier adapted to traverse the same during the reciprocatory movement and disengaged therefrom during the swinging movement.

16. In a labeling machine, the combination with a label holder and a work support, of a revoluble carrier for swinging the labels from one member to the other, means for swinging the carrier, means for reciprocating the same radially toward and from one of the members and means removed from the axis of the carrier for locking the carrier against swinging movement in both directions during the reciprocation thereof.

17. In a labeling machine, the combination with a label holder and a work support, of a revoluble carrier for swinging the labels from one member to the other, operating mechanism therefor, driving devices for the operating mechanism, means for reciprocating the carrier toward and from one of the members and temporarily disconnecting its operating mechanism from the driving devices and means for automatically locking the operating mechanism to prevent swinging of the carrier while said mechanism is disconnected from its driving means.

18. In a labeling machine, the combination with a support, a carriage arranged to reciprocate thereon, a swinging label carrier journaled on the carriage, driving devices on the support, operating mechanism for swinging the carrier movable with the reciprocations of the carriage into and out of coöperation with the driving devices and means for automatically locking the operating mechanism when out of position for coöperation with the latter and for releasing it when brought into such coöperative position.

19. In a labeling machine, the combination with a support, a carriage arranged to reciprocate thereon, a swinging label carrier journaled in the carriage, driving devices on the support, operating mechanism for swinging the carrier including a toothed member movable with the reciprocations of the carriage into and out of coöperation with the driving devices on the support, a spring pressed locking member on the carriage having a normal tendency to engage between the teeth of the toothed member to lock the swinging mechanism of the carrier and means on the support engaging the locking member to release said mechanism automatically as the toothed member moves into coöperative position relatively to the driving device.

20. In a labeling machine, the combination with a yoke shaped supporting frame, a supporting plate extending transversely between the arms of the yoke and a label holder and work support one of which members is mounted on the supporting plate, of a revolving carrier for transferring labels from the holder to an article on the work support, the path of the carrier extending transversely of and through the yoke to encircle the supporting plate.

21. In a labeling machine, the combination with a yoke shaped supporting frame, a supporting plate extending transversely between the arms of the yoke and carried by one of them and a label holder and work support, one of which members is mounted on the supporting plate, of a revolving picker head carried on the frame to operate in a plane extending between the supporting plate and the other arm of the yoke and a label carrier on the head for transferring labels from the holder to an article on the work support, the path of the carrier being transversely of and through the yoke to encircle the supporting plate.

22. In a labeling machine, the combination with a label holder, of an intermittently revolving picker arranged to pass the latter repeatedly in the same direction and having a radial movement toward and from the holder in the intervals between its revolving movements, an adhesive distributer coöperating with the bare face of the picker prior to its reciprocation, a work support and a stripper for transferring the pasted label from the picker to an article on the work support.

23. In a labeling machine, the combination with a movable label holder and a movable label carrier adapted to transfer labels therefrom, of a movable member, and coöperating parts on the movable member and label holder for operating the latter out of the path of the carrier, one of said parts being adjustably mounted to permit variations in the limit of movement of the holder relatively to the throw of the movable member.

24. In a labeling machine, the combination with a support having guides thereon, a label holder adjustable in the guides and a movable label carrier adapted to transfer labels from the holder, of a shaft arranged on the support parallel with the guides, and a dog, adjustable longitudinally of the shaft and coöperating with the label holder to operate it out of the path of the carrier with the actuations of the shaft.

25. In a labeling machine, the combination with a support having guides thereon, a bracket adjustable in the guides, a label holder movable on the bracket and a movable label carrier adapted to transfer labels from the holder, of a rock shaft journaled in the bracket and an adjustable dog thereon coöperating with the label holder to move it out of the path of the carrier when the shaft is actuated.

26. In a labeling machine, the combination with a supporting frame having a depending arm, a plate extending horizontally from the arm, a label holder movably mounted on the plate and a movable label carrier adapted to transfer labels from the holder, of a shaft mounted on the plate and connected with the label holder to operate the same into and out of the path of the carrier and an operating member for the shaft coöperating with the depending arm to lock the shaft against movement.

27. In a labeling machine, the combination with a supporting member, a label holder and a work support, one of said parts being arranged on the supporting member, and an adhesive distributer mounted on the latter, of a revolving picker for transferring labels from the label holder to an article on the work support, said picker being adapted to coöperate with the distributer and label holder successively and to encircle the supporting member and distributer during its revolution.

28. In a labeling machine, the combination with a supporting member, a label holder and work support, one of said parts being arranged upon one side of the supporting member, and an adhesive distributer mounted on the other side of the latter, of a revolving picker for transferring labels from the label holder to an article on the work support, said picker being adapted to coöperate with the distributer and label holder successively and to encircle the supporting member and distributer in its revolution.

29. In a labeling machine, the combination with the driving mechanism thereof, of a movable label picker, an adhesive distributer, and a device dependent upon the movements of the picker but otherwise independent of the driving mechanism for actuating the distributer into the path of the latter.

30. In a labeling machine, the combination with a label picker having a revolving and a reciprocating movement, of an adhesive distributer and a device dependent upon the reciprocating movement of the picker for actuating the distributer into the path of revolution of the picker.

31. In a labeling machine, the combination with a rotary picker head having a reciprocatory movement and a picker thereon movable therewith, of an adhesive distributer and a device actuated by the head during a reciprocation thereof for actuating the distributer into the rotary path of the picker.

32. In a labeling machine, the combination with a rotary picker head having a reciprocatory movement and a picker thereon movable therewith, of a lever arranged for oscillation by the head during a reciprocatory movement thereof and an adhesive distributer carried by the lever and actuated by the oscillations thereof into and out of the rotary path of the picker.

33. In a labeling machine, the combination with a supporting frame and a picker mechanism carried thereby including a movable picker, of adhesive feeding devices detachably mounted on the frame embodying a distributing member and a member carried by and detachable with the feeding devices for actuating the distributing member relatively to the path of the picker, said actuating member being in position to coöperate with and be operated by the picker mechanism when the feeding devices are in place on the support.

34. In a labeling machine, the combination with two supporting elements arranged in spaced relation, of adhesive feeding devices carried on one of them including a distributing member, a rotary picker head journaled on the other in a reciprocating bearing to rotate between the supporting elements and carrying a picker adapted to revolve about the feeding device and an actuating lever carried with the feeding device for moving the distributing member relatively to the path of the picker and coöperating with the picker head to be oscillated through the reciprocations thereof.

35. In a labeling machine, the combination with a swinging picker carrying member, of an offset picker projecting laterally therefrom and having its picking face disposed toward the center of movement of the member.

36. In a labeling machine, the combination with a swinging picker carrying member, of an offset picker projecting laterally therefrom and comprising bars arranged in spaced relation having picking faces disposed toward the center of movement of the member and a stripper movable transversely of the path of movement of the picker and between the bars in a direction away from said center to transfer a label from the picker to an article to be labeled.

37. In a labeling machine, the combination with a revolving picker arm, of an offset picker projecting laterally therefrom and having its picking face disposed toward the axis of movement of the arm, and an adhesive distributer and label holder arranged within the circular path of movement of the picker and with which the latter is adapted to successively coöperate.

38. In a labeling machine, the combination with a rotary picker head having oppositely disposed offset pickers projecting laterally therefrom, each comprising a pair of bars arranged in spaced relation with their picking faces turned toward the axis of movement of the head, an adhesive distributer and label holder arranged within the circular path of movement of the pickers and with which the latter are adapted to successively coöperate, a work support arranged outside said circular path and a stripper operating transversely of the latter between the picker bars to transfer a label therefrom to an article on the work support.

39. In a labeling machine, the combination with a bottle rest and a stripper movable toward and from a bottle arranged on the rest to clamp a label against the same, of a carrier arranged to rotate transversely of a bottle on the rest and to pass between the stripper and the bottle in approaching the latter to present a label and to recede therefrom by rotary motion in the same direction while the label is held clamped by the stripper against the bottle.

40. In a labeling machine, the combination with a work support and a stripper adapted to extend longitudinally of an article arranged therein, one of said members being movable toward and from and in contact with the other, of a carrier for delivering labels to the article movable toward and from the other members, said carrier being adapted to pass between the article and the stripper when approaching with the label and to pass to one side of both of them when receding.

41. In a labeling machine, the combination with a work support and a stripper movable toward and from an article arranged thereon to extend longitudinally thereof, of a swinging carrier for delivering labels to the article movable past the latter transversely of the same and of the stripper, said carrier being adapted to pass on one side of the latter between it and the article in delivering the label and to pass on the opposite side of one of the members and to one side of both on its return movement.

42. in a labeling machine, the combination with a work support and a stripper arranged above the same and movable intermittently toward and from the latter, of a label carrier having intermittent rotary and reciprocatory movement past, and toward and from the work support, respectively, means for swinging the carrier and label between the stripper and the article on the support, means for subsequently reciprocating the carrier upwardly to be swung by said first mentioned means above the stripper after the latter has moved downwardly toward the article on the support and means for operating the stripper in such timed relation.

43. In a labeling machine, the combination with a work support and a carrier for delivering labels to an article arranged on the support, of a stripper for transferring the label from the carrier to the article, said stripper being mounted upon pivoted links giving it a parallel movement toward and from the work support, and means for operating the stripper.

44. In a labeling machine, the combination with a work support, of a stripper arranged to extend longitudinally of a bottle arranged on the support, and movable toward and from the same to clamp a label thereon and a swinging picker also arranged to extend longitudinally of the bottle and movable transversely of the latter, the said picker and stripper having their respective supports at opposite ends of the bottle to permit the picker to pass between the bottle and stripper in presenting the label and on the opposite side of the latter in receding from the bottle.

45. In a labeling machine, the combination with a label carrier, of a stripper for transferring labels from the carrier to the article comprising a bar adapted to extend longitudinally of the article, collars adjustable longitudinally of the bar, a yielding yoke movable transversely of the bar and retained between the collars and a presser foot connected with the yoke.

46. In a labeling machine, the combination with a label carrier, of a stripper for transferring labels from the carrier to the article comprising a bar adapted to extend longitudinally of the article, and having a groove therein, a yoke adjustable longitudinally of the bar and movable transversely thereof, a presser foot connected with the yoke and a spring acting between the yoke and bar and having one end arranged in the slot in the latter, said spring acting to project the yoke outwardly from the bar.

47. In a labeling machine, the combination with a label carrier, of a stripper for transferring labels from the carrier to the article comprising a bar adapted to extend longitudinally of the latter and having a groove therein, a yoke spanning the bar to move transversely thereof, a presser foot connected with the yoke, a collar adjustable longitudinally of the bar and having a portion projecting within the yoke and a spring acting between the yoke and bar, said spring being arranged within the projecting portion of the collar and having one end seated in the slot in the bar.

48. In a labeling machine, the combination with a supporting frame having upper and lower guides thereon in vertical alinement and an intermediately arranged work support, of a picker carriage arranged to reciprocate on the upper guides above the work support and a reciprocatory wiper carriage on the lower guides below the work support.

49. In a labeling machine, the combination with a work support, of a pair of pivoted wiper arms the units of which are arranged on opposite sides thereof, an oscillatory member, connecting links pivoted thereto and directly to the arms, respectively, and means for oscillating the member to cause the wiper arms to move positively both toward and from the work support and each other.

50. In a labeling machine, the combination with a supporting frame and a carriage arranged to reciprocate thereon, of a work support carried by one of said members, a pair of wiper arms pivoted on the other to move toward and from the work support from opposite sides, an oscillatory lever pivoted on the member carrying the arms and operatively connected with the latter and coöperating parts on the work support carrying member and lever, respectively, for oscillating the latter comprising a cam track on one having a switch therein and a projection on the other traversing the track with the reciprocations of the carriage and under the guidance of the switch.

51. In a labeling machine, the combination with a supporting frame, a bracket thereon carrying a work support and having a plate provided with a cam track, guides on the frame and a carriage arranged to reciprocate on the guides adjacent the cam plate, of a pair of wiper arms pivoted on the carriage to extend upon opposite sides of the work support, a lever pivoted on the carriage and operatively connected with the wiper arms, a switch in the cam track, and a projection on the lever traversing the cam track under the guidance of the switch with the reciprocations of the carriage whereby the lever is oscillated and the wiper arms are rocked toward and from and reciprocated relatively to the work support.

52. In a labeling machine, the combination with a work support, of a wiper arm movable toward and from the work support, a wiper head carried thereon and embodying a split sleeve, a wiper having a stem adjustable in the split sleeve to adjust the wiper on the arm relatively to the work support and means for tightening the sleeve about the wiper stem.

53. In a labeling machine, the combination with a work support, of a wiper arm movable toward and from the work support, a wiper head carried thereon and embodying a split sleeve, a wiper having a stem adjustable in the sleeve to adjust the wiper on the arm toward and from the work support and a bolt for tightening the sleeve about the wiper stem, said bolt also operating as a means for adjusting the wiper head on the arm to change the inclination of the wiper relatively to the work support.

54. In a labeling machine, the combination with a bottle rest, a wiper arm having a movement toward and from and transversely of a bottle arranged on the rest and a wiper carried on the arm and adjustable thereon to different angles relatively to the longitudinal extent of the bottle, of means for swinging the wiper relatively to the arms in the direction of longitudinal extent of the bottle as the arm moves toward and from the latter.

55. In a labeling machine, the combination with a work support, and a carriage arranged to reciprocate vertically substantially directly beneath the work support, an arm pivoted on the carriage in a substantially vertical position and having a swinging movement toward and from the work support, a wiper carried on the arm to coöperate with one portion of an article arranged on the support, and a second wiper mounted on the arm to coöperate with another portion of the article and having an independently controlled movement on the arm relatively to the work support.

56. In a labeling machine, the combination with a work support, an arm movable relatively thereto and a wiper on the arm adapted to coöperate with one portion of an article arranged in the support, of a bracket on the arm and a second wiper mounted on the bracket to move relatively to the arm and to engage another portion of the article, said bracket being adjustable on the arm to permit the wipers to be spaced or adjusted relatively to each other.

57. In a labeling machine, the combination with a wiper arm, having a way therein and a wiper carrying plate mounted thereon having a slot therein extending transversely of the way, of means for securing said parts together and permitting their adjustment in two directions comprising a bolt having its head slidable in the way and passed through the slot in the wiper plate.

58. In a labeling machine, the combination with a work support, of a reciprocating carriage, a pair of wiper arms pivoted thereon, the units of which are arranged on opposite sides of the work support, a lever on the carriage connections between the lever and each wiper arm and means for oscillating the lever to cause the wiper arms to move relatively in unison toward and from the work support and each other in directions transverse to the reciprocating motion of the carriage.

59. In a labeling machine, the combination with a supporting frame and a carriage arranged to reciprocate thereon, of a work support carried by one of said members, a pair of wiper arms pivoted on the other to move toward and from the work support from opposite sides, an oscillatory lever pivoted on the member carrying the arms and operatively connected with the latter and coöperating parts on the work support carrying member and lever, respectively, for oscillating the latter comprising a cam on one and a projection on the other arranged to traverse the cam.

60. In a labeling machine, the combination with a work support, of a reciprocating member, a wiper arm pivoted thereto to move past the work support, a relatively stationary cam track, a switch member therein and a projection connected with the wiper arm and traversing the cam track with the reciprocations of the carriage to move the arm toward and from the work support as said projection alternates between opposite sides of the switch.

61. In a labeling machine, the combination with a frame, and a work support and a reciprocating carriage both mounted thereon, of a pair of wiper arms, the units of which are pivoted on the carriage to reciprocate therewith at opposite sides of the work support, an actuating device on the carriage common to both arms and with which each is connected to move the arms in unison toward and away from each other and the work support and an operating device for the actuating member carried on the frame.

62. In a labeling machine, the combination with a supporting frame having guides thereon, a bracket on the frame and a bottle rest on the bracket having a depending plate provided with a cam track, of a carriage movable on the guides, means for reciprocating the carriage, wiper arms pivoted on the latter on opposite sides of the bottle rest and having projections thereon coöperating with the cam track whereby the arms are oscillated toward and from the bottle rest as the carriage is reciprocated, wipers on the arms adapted to coöperate with the body of a bottle arranged on the rest, secondary arms pivoted on the first, secondary wipers thereon adapted to engage the bottle in the region of the neck and cams on the bracket coöperating with the secondary arms as the carriage is reciprocated to give the wipers carried thereby additional independent movement relatively to the bottle.

ALBERT T. WEISS.

Witnesses:
 RUSSELL B. GRIFFITH,
 LUCY A. VAN COURT.